US009485049B2

(12) United States Patent
McNicol et al.

(10) Patent No.: US 9,485,049 B2
(45) Date of Patent: Nov. 1, 2016

(54) ADJUSTING CARRIER SPACING IN A CHANNEL (71) Applicants: John D. McNicol, Ottowa (CA); Han H. Sun, Ottawa (CA); David J. Krause, Nepean (CA)

(72) Inventors: John D. McNicol, Ottowa (CA); Han H. Sun, Ottawa (CA); David J. Krause, Nepean (CA)

(73) Assignee: Infinera Corporation, Sunnyvale, CA (US)

( * ) Notice: Subject to any disclaimer, the term of this patent is extended or adjusted under 35 U.S.C. 154(b) by 3 days.

(21) Appl. No.: 13/853,421

(22) Filed: Mar. 29, 2013

(65) Prior Publication Data
US 2014/0294381 A1 Oct. 2, 2014

(51) Int. Cl.
H04B 10/079 (2013.01)
H04J 14/02 (2006.01)
H04B 10/04 (2006.01)
H04B 10/077 (2013.01)
H04B 10/50 (2013.01)

(52) U.S. Cl.
CPC ....... *H04J 14/0224* (2013.01); *H04B 10/0775* (2013.01); *H04B 10/506* (2013.01); *H04J 14/0273* (2013.01); *H04B 2210/072* (2013.01)

(58) Field of Classification Search
CPC ............ H04J 14/0224; H04J 14/0221; H04B 10/079
USPC .................................. 398/34, 25, 9
See application file for complete search history.

(56) References Cited

U.S. PATENT DOCUMENTS

| 4,893,300 | A | * | 1/1990 | Carlin | H04J 1/14 398/32 |
| 5,127,731 | A | * | 7/1992 | DeGroot | H01S 5/0687 356/486 |
| 5,132,633 | A | * | 7/1992 | Wong | H03B 21/00 327/105 |
| 5,365,361 | A | * | 11/1994 | Noll | H04B 10/50 398/204 |
| 5,589,970 | A | * | 12/1996 | Lyu | H04B 10/572 398/14 |
| 5,680,238 | A | * | 10/1997 | Masuda | H04J 14/0298 398/76 |
| 5,726,974 | A | * | 3/1998 | Kunieda | H04J 11/00 370/206 |
| 5,896,211 | A | * | 4/1999 | Watanabe | H04B 10/50 398/187 |

(Continued)

*Primary Examiner* — Oommen Jacob
(74) *Attorney, Agent, or Firm* — David L. Soltz (57) ABSTRACT

An optical system may include optical transmitters to provide respective optical signals. Each of the respective optical signals may provide one or more carriers in an optical channel. The optical channel may include multiple carriers associated with the respective optical signals. First and second carriers, of the multiple carriers, may have a particular carrier space width. The particular carrier space width may include a frequency error associated with one or more optical signals of the respective optical signals. The optical system may include a control system to determine the frequency error and cause one or more of the optical transmitters to adjust the particular carrier space width based on the adjusted frequency error.

11 Claims, 7 Drawing Sheets (56) References Cited

U.S. PATENT DOCUMENTS

| | | | | |
|---|---|---|---|---|
| 6,215,572 B1* | 4/2001 | Taneda | H04J 14/02 | 398/9 |
| 6,233,261 B1* | 5/2001 | Mesh | H01S 5/40 | 372/20 |
| 6,240,109 B1* | 5/2001 | Shieh | H01S 5/0687 | 372/18 |
| 6,351,583 B1* | 2/2002 | Bergmann | G02B 6/12019 | 385/24 |
| 6,369,926 B1* | 4/2002 | Lyu | H04B 10/506 | 372/32 |
| 6,493,125 B1* | 12/2002 | Tanaka | H01S 5/0687 | 372/29.011 |
| 6,671,465 B1* | 12/2003 | Cohen | H04B 10/58 | 398/140 |
| 7,039,319 B1* | 5/2006 | Moulton | H04B 10/506 | 398/196 |
| 7,058,097 B2* | 6/2006 | Ahmadvand | H01S 3/13 | 372/20 |
| 7,162,164 B2* | 1/2007 | Brown | H04B 10/505 | 398/183 |
| 2002/0048063 A1* | 4/2002 | Jung | H04B 10/506 | 398/95 |
| 2002/0196527 A1* | 12/2002 | Veith | H04B 10/2916 | 359/334 |
| 2003/0025957 A1* | 2/2003 | Jayakumar | H04B 10/00 | 398/5 |
| 2003/0030876 A1* | 2/2003 | Takei | H04B 10/506 | 398/197 |
| 2003/0048508 A1* | 3/2003 | Yu | H04B 10/506 | 398/91 |
| 2003/0076568 A1* | 4/2003 | Wu et al. | | 359/187 |
| 2003/0128990 A1* | 7/2003 | Ackerman | G02F 1/0147 | 398/201 |
| 2005/0220397 A1* | 10/2005 | Oikawa et al. | | 385/24 |
| 2006/0002438 A1* | 1/2006 | Brown | H04B 10/572 | 372/32 |
| 2007/0147528 A1* | 6/2007 | Kim | H04L 5/06 | 375/260 |
| 2007/0297801 A1* | 12/2007 | Mostert et al. | | 398/81 |
| 2010/0239246 A1* | 9/2010 | Taylor et al. | | 398/34 |
| 2011/0176594 A1* | 7/2011 | Fang | H04L 1/0026 | 375/224 |
| 2012/0251101 A1* | 10/2012 | McNicol | H04B 10/506 | 398/25 |

* cited by examiner

ADJUSTING CARRIER SPACING IN A CHANNEL

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator that modulates the output of the laser, and a multiplexer that combines each of the modulated outputs (e.g., to form a combined output or WDM signal).

A WDM system may also include a receiver circuit having a receiver (Rx) PIC and an optical demultiplexer circuit (referred to as a "demultiplexer") that receives the combined output and demultiplexes the combined output into individual optical signals. Additionally, the receiver circuit may include receiver components that convert the optical signals into electrical signals, and output the data carried by those electrical signals.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, or various polymers and semiconductor materials which are used to make semiconductor lasers, such as GaAs and InP and their alloys.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel "grid" for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs. The spacing, between the channels, may be less than 200 GHz, in order to tightly pack the channels together to form a super channel.

SUMMARY

According to some possible implementations, an optical system may include optical transmitters to provide respective optical signals. Each of the respective optical signals may provide one or more carriers in an optical channel. The optical channel may include multiple carriers associated with the respective optical signals. First and second carriers, of the multiple carriers, may have a particular carrier space width. The particular carrier space width may include a frequency error associated with one or more optical signals of the respective optical signals. The optical system may include a control system to determine the frequency error and cause one or more of the optical transmitters to adjust the particular carrier space width based on the adjusted frequency error.

According to some possible implementations, an optical system may include optical transmitters to provide respective optical signals. Each of the respective optical signals may provide a single carrier in an optical channel. The optical channel may include multiple carriers associated with the respective optical signals. First and second carriers, of the multiple carriers, may have a particular carrier space width. The particular carrier space width may include a frequency error associated with one or more optical signals of the respective optical signals. The optical system may include a control system to determine the frequency error and cause one or more of the optical transmitters to adjust the particular carrier space width based on the adjusted frequency error.

According to some possible implementations, an optical system may include optical transmitters to provide respective optical signals. The optical signal may provide multiple carriers in an optical channel. The optical channel may include the multiple carriers associated with optical signal. First and second carriers, of the multiple carriers, may have a particular carrier space width. The particular carrier space width may include a frequency error associated with the optical signal. The optical system may include a control system to determine the frequency error and cause the optical transmitter to adjust the particular carrier space width based on the adjusted frequency error.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Figure 1A:
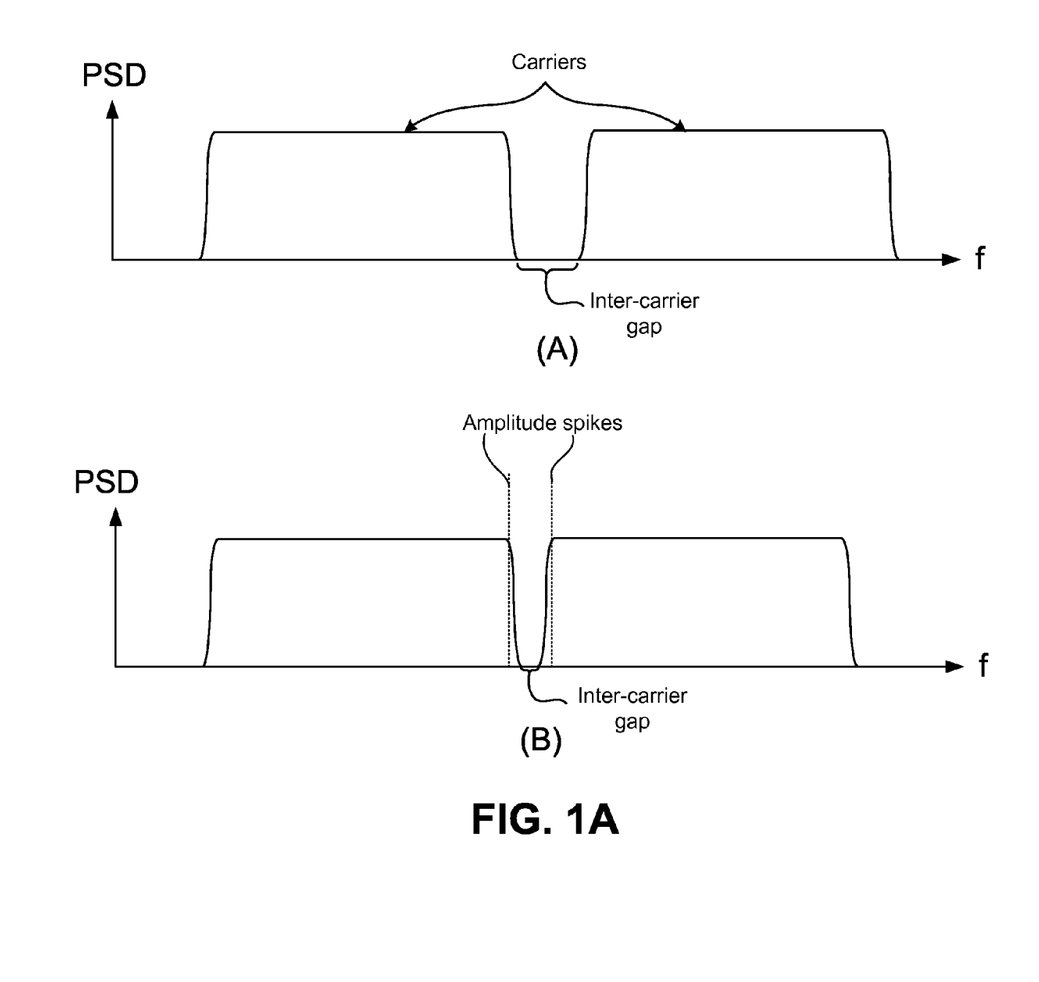
FIGS. 1A-1B are a diagrams illustrating an overview of an example implementation described herein.

FIG. 1A is a diagram illustrating an overview of an example implementation described herein. In an optical communication system, a certain bandwidth, or spectrum, may be allocated to an optical communications channel. As shown in (A), the channel may include multiple carriers (e.g., multiple single carriers associated with respective optical signals, and/or multiple subcarriers associated with a single optical signal). The multiple carriers may be separated by a particular carrier spacing width (hereinafter referred to as a "inter-carrier gap"). The inter-carrier gap may be provided to allow for filter processing performed by a digital signal processor associated with the channel, to allow for frequency variations in optical signals associated with the carriers, and/or to provide an additional reserve (e.g., a frequency error) for processing and/or frequency variations. While some implementations are describe in terms of "carriers", in practice, some implementations may also apply to subcarriers. Similarly, some implementations described in terms of "subcarriers" may also apply to carriers.

A system and/or method, as described herein, may provide predetermined (e.g., test) pattern symbols in carriers of an optical channel to measure a frequency error and adjust frequencies of optical signals, providing the carriers, based on the frequency error. In some implementations, a control system may provide a signal, indicative of the frequency error, to components of optical sources (e.g., heaters, control ports, etc.) to adjust the frequency error in the optical signals, thereby adjusting the inter-carrier gap between the carriers. For example, as shown in (B), the inter-carrier gap may be reduced as a result of adjusting the components of the optical source based on the frequency error. For example, spikes in amplitudes in the spectrum of a pair of carriers may be identified to determine the inter-carrier gap. Once the inter-carrier gap is determined, a frequency error, corresponding to a difference in the inter-carrier gap and a targeted inter-carrier gap, may be determined to adjust a component of the optical source (e.g., adjust the temperature of heating provided to the optical source to adjust the instantaneous frequency of the optical signal provided by the optical source).

Figure 1B:
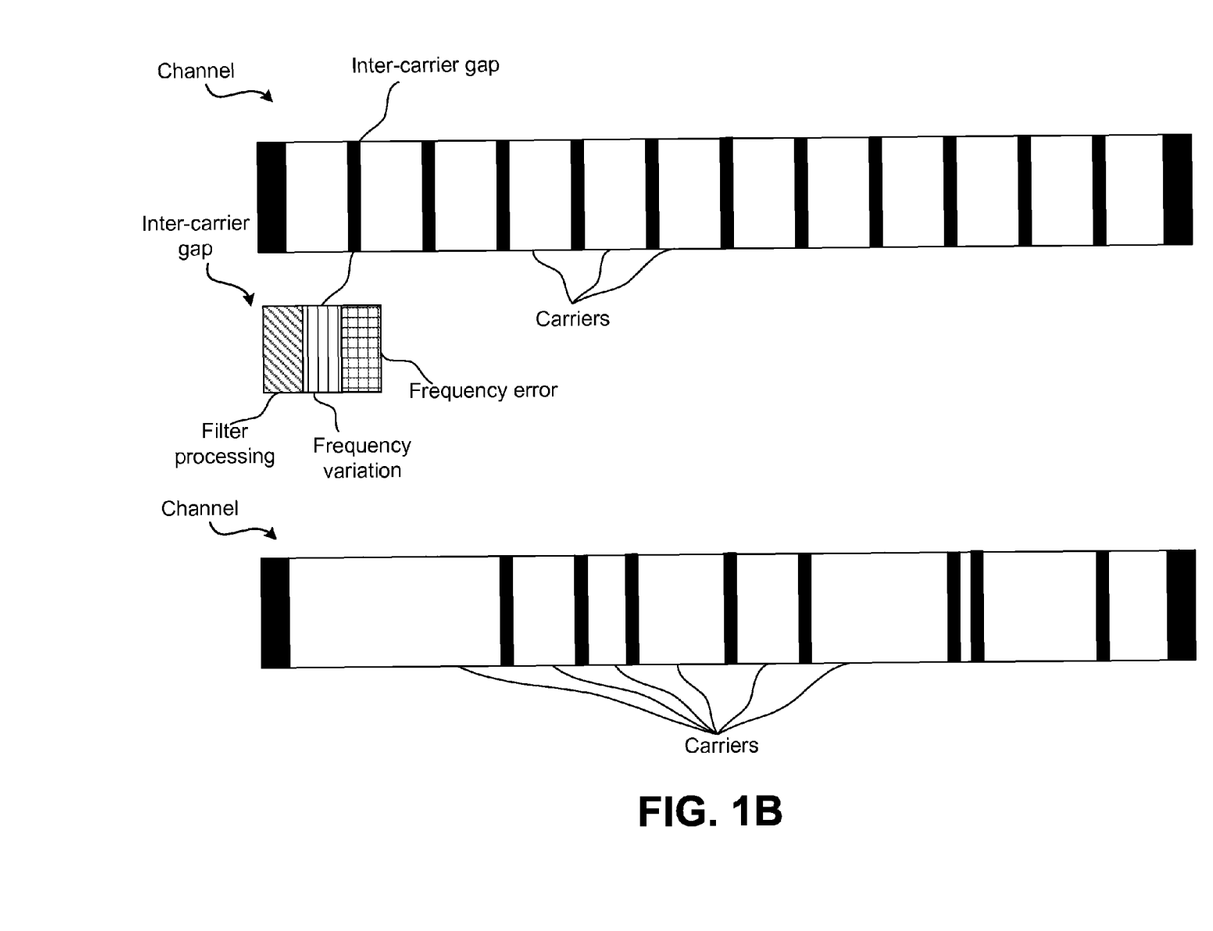

Referring to FIG. 1B, a channel (e.g., a super channel) may include multiple carriers, each separated by inter-carrier gap. Each inter-carrier gap, as described above, may include filter processing spacing, frequency variation spacing, and/or frequency error spacing. Thus, a reduction in frequency errors may result in a reduction in the overall inter-carrier gap. As further shown in FIG. 1B, frequency error may be reduced to reduce inter-carrier gap in a channel that includes carriers of varying widths.

In some implementations, a reduction in inter-carrier gap may allow additional bandwidth to be allocated for a channel having a particular width. Further, the additional bandwidth may be allocated while still providing for a sufficient inter-carrier gap to accommodate for processing and frequency variations.

In a case where multiple subcarriers are provided by a single optical signal, a reduction in spacing between the multiple subcarriers may allow additional subcarriers to be provided. Additional subcarriers may reduce a performance penalty due to the combination of a receiver laser linewidth and electronic dispersion compensation. Additional subcarriers may also permit bit error rate (BER) averaging over the subcarriers, which can lead to performance benefits. Additional subcarriers may also reduce power consumption. In some implementations, the optical signals, providing the carriers, may be modulated using dual-polarization Quadrature Phase Shift Keying (DP-QPSK) or some other type of modulation technique (e.g., DP-binary PSK (DP-BPSK), DP-8-quadrature amplitude modulation (QAM), or the like).

Figure 2:
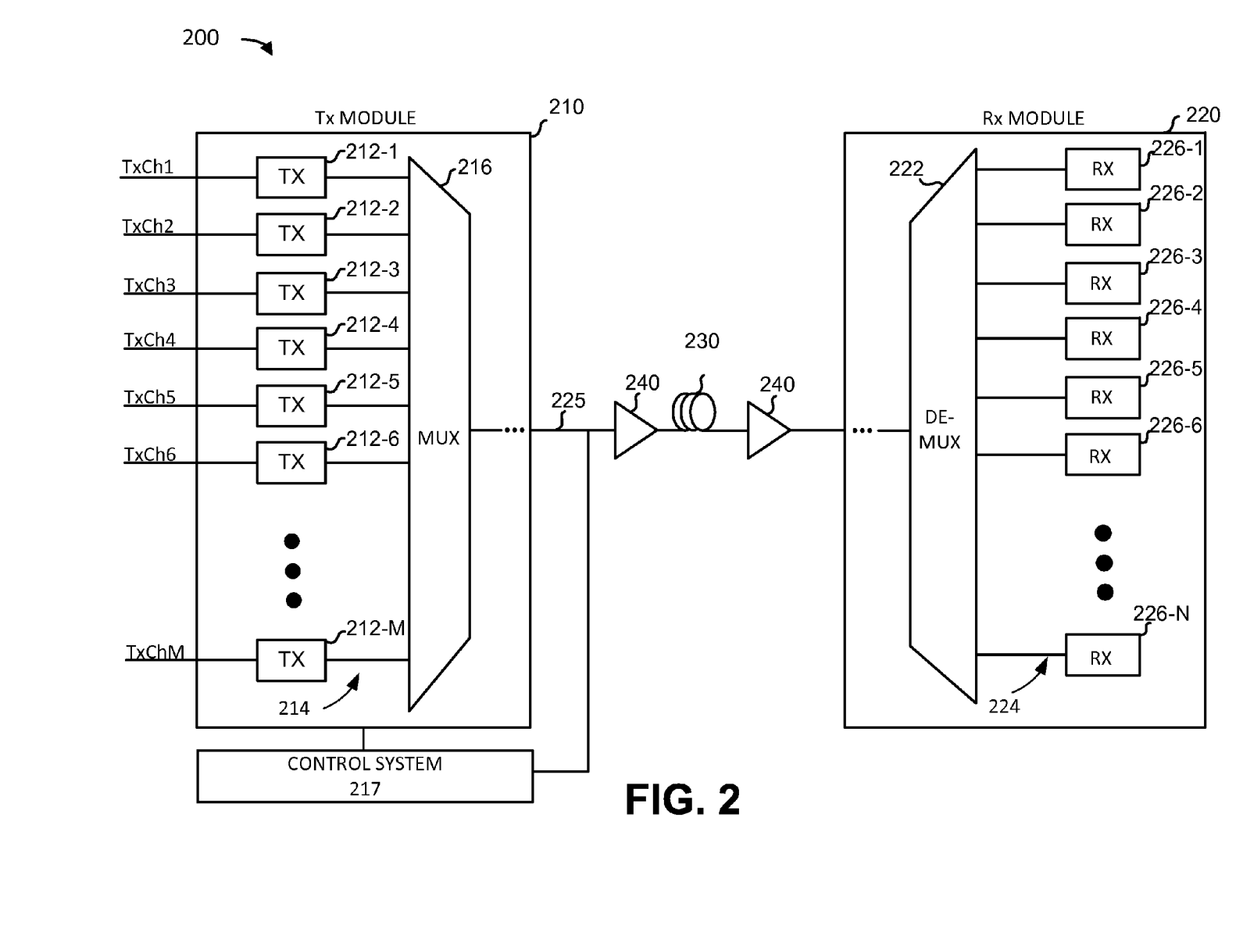
FIG. 2 is a diagram of an example network in which systems and/or methods, described herein, may be implemented.

FIG. 2 is a diagram of an example network 200 in which systems and/or methods described herein may be implemented. As illustrated in FIG. 2, network 200 may include transmitter (Tx) module 210 (e.g., a Tx PIC), control system 217, and/or receiver (Rx) module 220 (e.g., an Rx PIC). In some implementations, transmitter module 210 may be optically connected to receiver module 220 via link 230. Additionally, link 230 may include one or more optical amplifiers 240 that amplify an optical signal as the optical signal is transmitted over link 230.

Transmitter module 210 may include a number of optical transmitters 212-1 through 212-M (where M≥1), waveguides 214, and/or optical multiplexer 216. In some implementations, transmitter module 210 may include additional components, fewer components, different components, or differently arranged components.

Each optical transmitter 212 may receive data for a data channel (shown as TxCh1 through TxChM), create multiple subcarriers for the data channel, map data, for the data channel, to the multiple subcarriers, modulate the data with an optical signal to create a multiple subcarrier output optical signal, and transmit the multiple subcarrier output optical signal. In one implementation, transmitter module 210 may include 5, 10, 20, 50, 100, or some other quantity of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T). It may also be desirable that the grid of wavelengths be flexible and tightly packed to create a super channel.

In some implementations, each of optical transmitters 212 may include a TX DSP, a digital-to-analog converter (DAC), a laser, a modulator, and/or some other components. The laser and/or the modulator may be coupled with a tuning element that can be used to tune the wavelength of the optical signal channel.

Waveguides 214 may include an optical link or some other link to transmit output optical signals of optical transmitters 212. In some implementations, each optical transmitter 212 may include one waveguide 214, or multiple waveguides 214, to transmit output optical signals of optical transmitters 212 to optical multiplexer 216.

Optical multiplexer 216 may include an arrayed waveguide grating (AWG) or some other multiplexing device. In some implementations, optical multiplexer 216 may combine multiple signal channels, associated with optical transmitters 216, into a wave division multiplexed (WDM) signal, such as WDM signal 225.

In some implementations, WDM signal 225 can be formed via a multiple groups of optical transmitters 212. For example, a first transmitter module 210 may a number of optical transmitters 212 to provide a corresponding number of optical signals. A second transmitter module 210 may include a number of transmitters 212 to provide a corresponding number of additional optical signals. An adding circuit may be provided to add the optical signals provided by the first and second optical transmitters 212 to form WDM signal 225. In some implementations, WDM signal 225 may correspond to a single super channel having multiple carriers associated with multiple optical signals provided by optical transmitters 212.

Control system 217 may include components to determine a frequency error associated with an optical signal provided by optical transmitter 212 and/or associated with WDM signal 225. For example, control system 217 may include a control logic component, a photodetector, a multiplier circuit, an oscillator circuit, a low-pass filter (LPF) and/or an error calculation circuit. In some implementations, control system 217 may provide a signal, indicative of the frequency error, to optical transmitters to 212 to adjust components of optical transmitters 212 (e.g., a heater, a frequency control port, a laser control port, etc.) to modify a frequency of an optical signal provided by a laser of optical transmitter 212 (e.g., to adjust the frequency error and to adjust inter-carrier gap to a desired spacing). In some implementations, a particular control system 217 may be associated with a particular WDM signal 225 (e.g., an optical signal having a single super channel with multiple carriers). Thus, in an implementation having multiple super channels, multiple control systems 217 may be provided (i.e. one control system 217 for each super channel). Further operations of control system 217 are described below with respect to FIG. 5.

Link 230 may include an optical fiber. Link 230 may transport one or more optical signals associated with multiple wavelengths. Amplifier 240 may include an amplification device, such as a doped fiber amplifier or a Raman amplifier. Amplifier 240 may amplify the optical signals as the optical signals are transmitted via link 230.

Receiver module 220 may include optical demultiplexer 222, waveguides 224, and/or optical receivers 226-1 through 226-N (where N≥1). In some implementations, receiver module 220 may include additional components, fewer components, different components, or differently arranged components.

Optical demultiplexer 222 may include an AWG or some other device. Optical demultiplexer 222 may supply multiple signal channels based on a received WDM signal (e.g., WDM signal 225). As shown in FIG. 2, optical demultiplexer 222 may supply signal channels to optical receivers 226 via waveguides 224.

Waveguides 224 may include an optical link or some other link to transmit optical signals, output from optical demultiplexer 222, to optical receivers 226. In some implementations, each optical receiver 226 may receive optical signals via a single waveguide 224 or via multiple waveguides 224.

Optical receivers 226 may each include one or more photodetectors and related devices to receive respective input optical signals outputted by optical demultiplexer 222, detect the subcarriers associated with the input optical signals, convert data within the subcarriers to voltage signals, convert the voltage signals to digital samples, and process the digital samples to produce output data corresponding to the input optical signals. Optical receivers 226 may each operate to convert the input optical signal to an electrical signal that represents the transmitted data. In some implementations, each of optical receivers 226 may include a local oscillator, a hybrid mixer, a detector, an analog-to-digital converter (ADC), an RX DSP, and/or some other components.

While FIG. 2 shows network 200 as including a particular quantity and arrangement of components, in some implementations, network 200 may include additional components, fewer components, different components, or differently arranged components. Also, in some instances, one of the devices illustrated in FIG. 2 may perform a function described herein as being performed by another one of the devices illustrated in FIG. 2.

Figure 3:
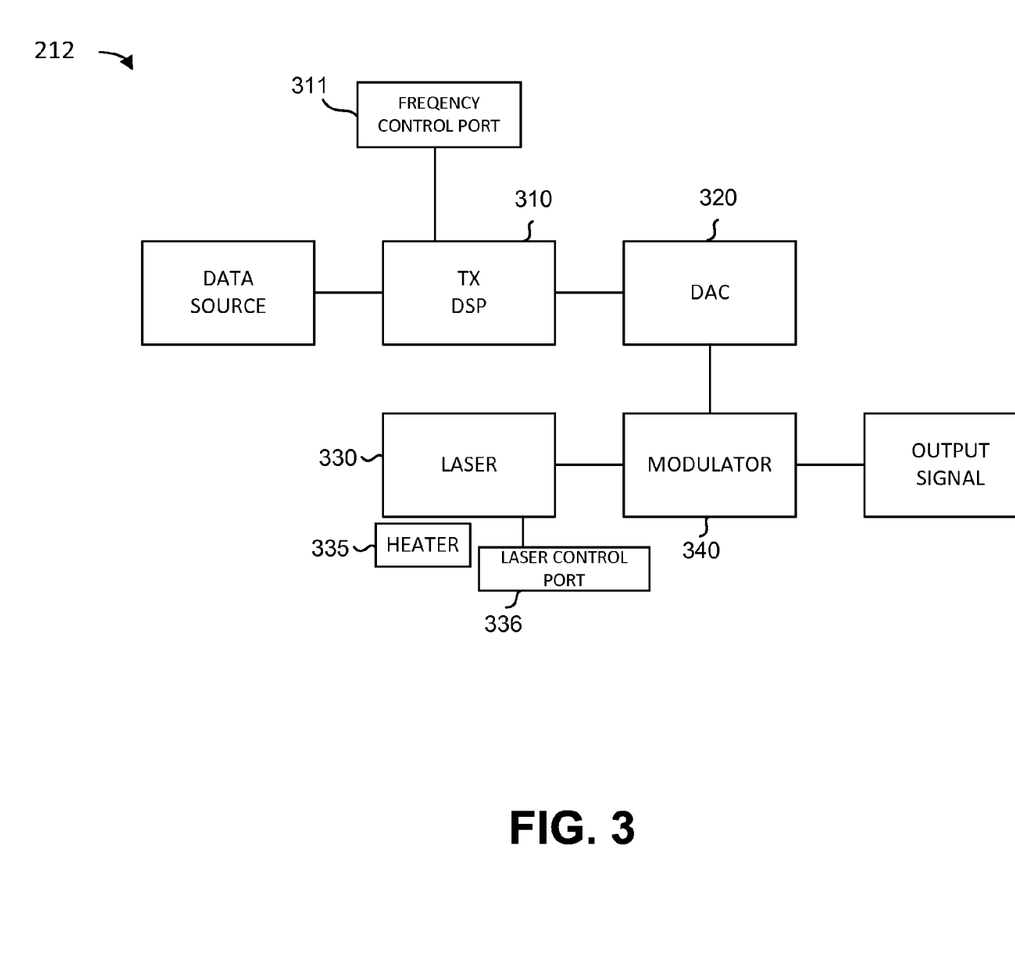
FIG. 3 is a diagram illustrating an example of components of an optical transmitter shown in FIG. 2.

FIG. 3 is a diagram illustrating an example of components of an optical transmitter 212. As shown in FIG. 3, optical transmitter 212 may include a TX DSP 310, a DAC 320, a laser 330, a heater 335, and a modulator 340. In some implementations, TX DSP 310 and DAC 320 may be implemented using an application specific integrated circuit (ASIC) and/or may be implemented on a single integrated circuit, such as a single PIC. In some implementations, laser 330 and modulator 340 may be implemented on a single integrated circuit, such as a single PIC. In some other implementations, TX DSP 310, DAC 320, laser 330, and/or modulator 340 may be implemented on one or more integrated circuits, such as one or more PICs. For example, in some example implementations, components of multiple optical transmitters 212 may be implemented on a single integrated circuit, such as a single PIC, to form a super-channel transmitter.

TX DSP 310 may include a digital signal processor. TX DSP 310 may receive input data from a data source, and determine the signal to apply to modulator 340 to generate multiple subcarriers. In some implementations, TX DSP 310 may receive streams of data, map the streams of data into each of the subcarriers, independently apply spectral shaping to each of the subcarriers, and obtain, based on the spectral shaping of each of the subcarriers, a sequence of assigned integers to supply to DAC 320. In some implementations, TX DSP 310 may generate the subcarriers using time domain filtering and frequency shifting by multiplication in the time domain.

In some implementations, TX DSP 310 may provide a burst of predetermined symbols on a carrier (or multiple subcarriers) of a channel (e.g., a channel associated with WDM signal 225). For example, TX DSP 310 may provide the burst on the carrier(s) associated with an optical signal provided by laser 330 (e.g., an optical signal that is part of WDM signal 225). As described in greater detail below with respect to FIGS. 4-5, the predetermined symbols may be used to determine spacing between carriers in the channel. In some implementations, multiple TX DSPs 310, associated with respective transmitter modules 212, may be synchronized to provide the burst of predetermined symbols at the same time (e.g., based on a clock reference associated with TX DSPs 310) such that the carriers of WDM signal 225 receive the burst at the same instant in time.

In some implementations, TX DSP 310 may include a schedule that identifies a time index to provide the burst of predetermined symbols and the carrier(s) with which to provide the predetermined symbols. In some implementations, multiple TX DSPs 310 may include the same schedule such that the multiple TX DSPs 310 provide the burst to the carriers at the same time. In some implementations, some or all of optical transmitters 212 in transmitter module 210 may follow a global schedule to provide bursts of predetermined symbols.

In some implementations, TX DSP 310 may include frequency control port 311 to receive a signal (e.g., from control system 217) that adjusts the optical frequency of an optical signal (e.g., an optical signal provided by laser 330) via modulator 340. In some implementations, control system 217 may provide the signal to frequency control port 311 such that the TX DSP 310 may calculate the modulation to produce the desired optical frequency (e.g., to adjust the frequency error in the optical signal).

DAC 320 may include a digital-to-analog converter. DAC 320 may receive the sequence of assigned integers and, based on the sequence of assigned integers, generate the voltage signals to apply to modulator 340.

Laser 330 may include a semiconductor laser, such as a distributed feedback (DFB) laser, or some other type of laser. Laser 330 may provide an output optical signal (e.g., an optical beam) to modulator 340. In some implementations, laser 330 may include laser control port 336 (e.g., an adjustable phase current section, an adjustable reflector, and/or some other type of adjusting device) for which the optical frequency of the output optical signal can be tuned based on laser control port 336. In some implementations, control system 217 may provide a signal to the laser control port 336 to adjust the optical frequency of the optical signal provided by laser 330.

Heater 335 may include a heating device or a collection of heating devices. In some implementations, heater 335 may be located adjacent to laser 330 such that heater 335 may tune a wavelength and/or modify an instantaneous frequency of an optical beam provided by laser 330. In some implementations, heater 335 may be adjusted according to a determined frequency error associated with a inter-carrier gap (e.g., to adjust the instantaneous frequency change of the optical beam in order to reduce the frequency error). For example, control system 217 may adjust a temperature of heat provided by heater 335 based on the frequency error.

Modulator 340 may include a Mach-Zehnder modulator (MZM), such as a nested MZM, or another type of modulator. Modulator 340 may receive the optical signal from laser 330 and the voltage signals from DAC 320, and may modulate the optical signal, based on the voltage signals. In some implementations, modulator 340 may modulate the optical signal to generate a single carrier optical signal or a multiple subcarrier output signal. In some implementations, modulator 340 may include a dual-polarized optical modulator and may include binary data inputs for x-polarized in-phase (I) components, x-polarized quad-phase (Q) components, y-polarized I components, and y-polarized Q components. In some implementations, modulator 340 may form a single constellation such as a DP-QPSK constellation, a DP-16-QAM constellation, or some other type of constellation.

While FIG. 3 shows optical transmitter 212 as including a particular quantity and arrangement of components, in some implementations, optical transmitter 212 may include additional components, fewer components, different components, or differently arranged components. For example, heater 335 may be arranged adjacent to laser 330 and/or modulator 340 (e.g., to tune the optical beam provided by laser 330 and/or to tune the optical signal provided by modulator 340). The quantity of DACs 320, lasers 330, and/or modulators 340 may be selected to implement an optical transmitter 212 that is capable of generating polarization diverse signals for transmission on an optical fiber, such as link 230. In some instances, one of the components illustrated in FIG. 3 may perform a function described herein as being performed by another one of the components illustrated in FIG. 3.

Figure 4:
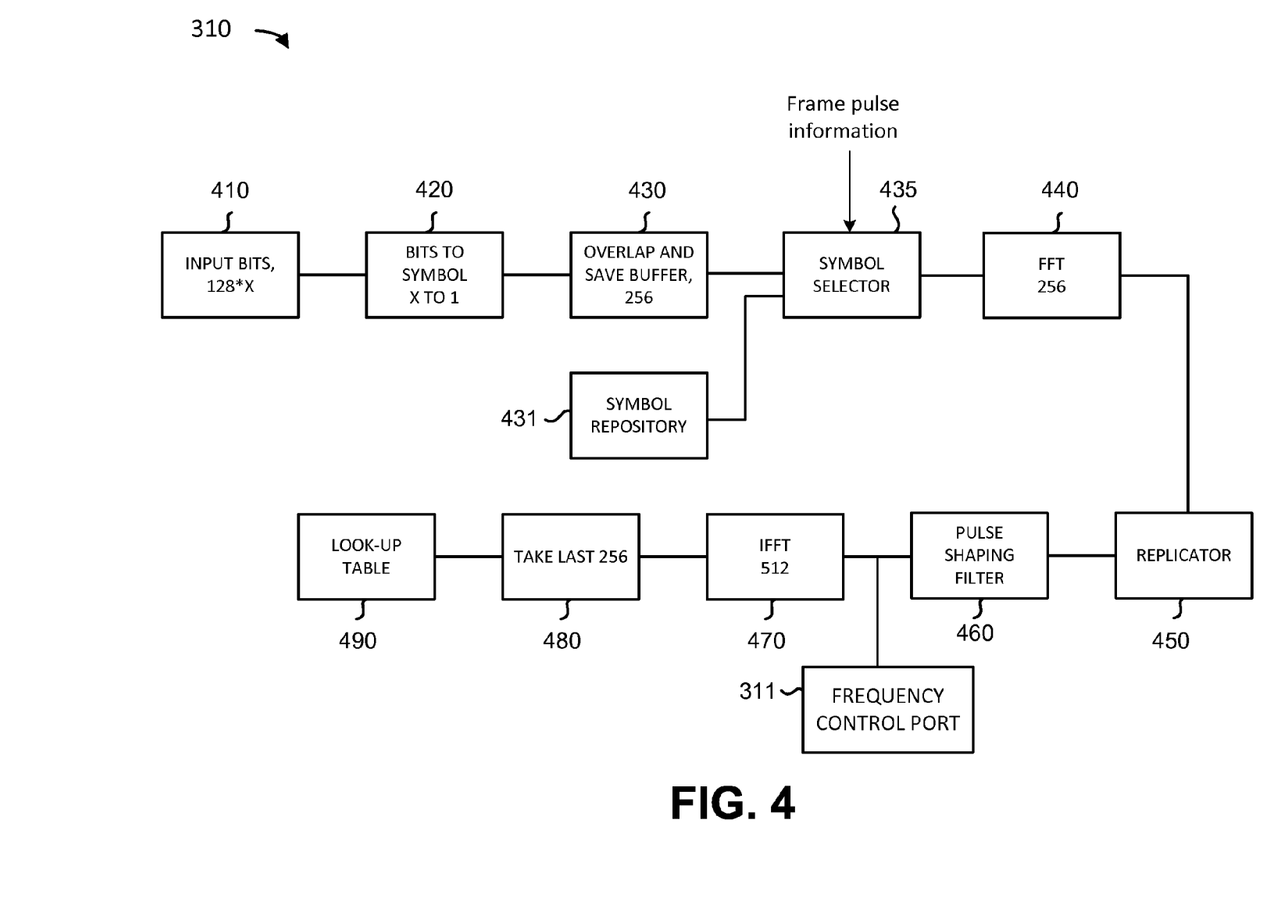
FIG. 4 is a diagram illustrating example components of a transmitter digital signal processor (DSP) shown in FIG. 3.

FIG. 4 is a diagram illustrating example functional components of TX DSP 310. The particular functional components, which may be included in TX DSP 310, may vary based on desired performance characteristics and/or computational complexity.

As shown in FIG. 4, TX DSP 310 may include an input bits component 410, a bits to symbol component 420, an overlap and save buffer 430, a symbol repository 431, a symbol selector 435, a fast Fourier transfer (FFT) component 440, a replicator component 450, a pulse shape filter 460, an inverse FFT (IFFT) component 470, a take last 256 component 480, and a look-up table component 490.

Input bits component 410 may process 128*X bits at a time of the input data, where X is an integer. For dual-polarization Quadrature Phase Shift Keying (QPSK), X would be four. Bits to symbol component 420 may map the bits to symbols on the complex plane. For example, bits to symbol component 420 may map four bits to a symbol in the dual-polarization QPSK constellation. Overlap and save buffer 430 may buffer 256 symbols. Overlap and save buffer 430 may receive 128 symbols at a time from bits to symbol component 420. Thus, overlap and save buffer 430 may combine 128 new symbols, from bits to symbol component 420, with the previous 128 symbols received from bits to symbol component 420.

Symbol repository 431 may store a predetermined series of symbols (e.g., test pattern symbols) that may be used to determine spacing between carriers associated with a channel. In some implementations, the predetermined series of symbols may correspond to a toggle pattern (e.g., a pattern of alternating 1s and 0s or some other pattern) that may be provided to a targeted pair of adjacent carriers on a channel (e.g., carriers whose spacing is to be determined). Additionally, the predetermined series of symbols may correspond to a load pattern to be provided to remaining carriers on the channel. In some implementations, the toggle pattern and load pattern may be provided to different pairs of carriers over different periods of time (e.g., to determine spacing between different pairs of carriers).

In some implementations, the toggle pattern and load pattern may include a particular data sequence on different components of an optical signal (e.g., a pattern on the x-polarized I components, x-polarized Q components, y-polarized I components, and y-polarized Q components). Additionally, the phase of the optical carriers in the x-polarization may be selected as pi, −pi, or some other phase. The phase of the optical carriers in the y-polarization may be selected as offset+pi, offset−pi (where the offset may vary from 0, pi/2, pi, 3*pi/2, etc. and may be selected for a particular time instant based on a round robin technique, a random selection technique, a pseudo random selection technique, or some other technique). In some implementations, (e.g., when optical signals include multiple subcarriers), the toggle pattern may be provided to the subcarriers on the edge of adjacent optical signals.

In some implementations, the load pattern may be half of the rate of the toggle pattern and may be offset by one symbol for I and Q portions of a corresponding optical signal. Additionally, or alternatively, the load pattern may be offset 1/Y (where Y>2) from the toggle pattern. Additionally, or alternatively, the load pattern may include a fixed set of data (e.g., all 1s). Additionally, or alternatively, the load pattern may include a pattern provided by a predetermined algorithm, such as an algorithm associated with a pseudo-random bit sequence generator. Additionally, or alternatively, the load pattern may include random data including input data. Additionally, or alternatively, the load pattern may include some other type of pattern (e.g., a pattern provided by an over-sampled DAC). In some implementations, the load pattern may be used to generate a separation between adjacent target carriers whose spacing is being tested and the other carriers in a channel (e.g., to isolate and easily identify a beat in the spectrum that identifies the frequency error). In some implementations, some carriers in a channel may receive a plus load pattern and other carriers in the channel may receive a minus load pattern.

Symbol selector 435 may include a 2:1 selector or some other type of symbol selection component. In some implementations, symbol selector 435 may receive symbols from overlap and save buffer 430 and from symbol repository 431. In some implementations, symbol selector 435 may select symbols to provide to FFT component 440. For example, at a particular instant in time, symbol selector 435 may select symbols associated with input data (e.g., symbols received from overlap and save buffer 430) or may select predetermined symbols (e.g., symbols received from symbol repository 431).

In some implementations, symbol selector 435 may receive frame pulse information (e.g., from control system 217) that identifies time instances when symbol selector 435 is to provide the predetermined symbols and particular carriers to provide the predetermined symbols. Alternatively, symbol selector 435 may store the frame pulse information based on a design decision of TX DSP 310 that identifies a target inter-carrier gap. In some implementations, the frame pulse information may be generated by an algorithm used to identify predetermined symbols to provide to particular carriers at particular instances in time (e.g., a round-robin algorithm and/or some other type of algorithm). In some implementations, different modulation techniques may be used to provide input symbols and predetermined symbols.

FFT component 440 may receive symbols from symbol selector 435, and may convert the symbols to the frequency domain using, for example, a fast Fourier transform (FFT). FFT component 440 may form 256 frequency bins as a result of performing the FFT. In some implementations, replicator component 450 may replicate the 256 frequency bins to form 512 frequency bins. This replication may increase the sample rate.

Pulse shape filter 460 may apply a pulse shaping filter to the 512 frequency bins. The purpose of pulse shape filter 460 is to calculate the transitions between the symbols and a desired spectrum so that channels can be packed together on a super-channel. In some implementations (e.g., when an optical signal, provided by optical transmitter 212, is to include multiple subcarriers), pulse shape filter 460 may calculate the transitions between the symbols and the desired spectrum so that subcarriers can be packed together on a channel associated with the optical signal. Pulse shape filter 460 may also be used to introduce timing skew between the subcarriers to correct for timing skew induced by link 230. In some implementations, the frequency of the optical signal may be adjusted based on input received via frequency control port 311, by adjusting the mapping of frequency bins.

IFFT component 470 may receive the 512 frequency bins and return the signal back to the time domain, which may now be at the operating speed of DAC 320. In some implementations, the signal may include symbols associated with an input signal and/or predetermined signals provided by symbol repository 431. IFFT component 470 may convert the signal to the time domain using, for example, an inverse fast Fourier transform (IFFT). Take last 256 component 480 may select the last 256 samples from IFFT component 470. Look-up table 490 may include a table that identifies the integers to supply to DAC 320 based on the samples from take last 256 component 480. In some example implementations, look-up table 490 may include electrical field values and associated voltage signals. Look-up table 490 may use the samples to identify and output the appropriate integers. As explained above, DAC 320 may generate voltage signals based on the integers from TX DSP 310.

While FIG. 4 shows TX DSP 310 as including a particular quantity and arrangement of functional components, in some implementations, TX DSP 310 may include additional functional components, fewer functional components, different functional components, or differently arranged functional components. For example, TX DSP 310 may include a forward error correction (FEC) encoder to receive an input stream of bits and perform error correction coding, such as through the addition of parity bits. Additionally, TX DPS 310 may include a de-mux component to receive the stream of bits of data and perform a demultiplexing operation on the stream of bits to separate the stream of bits into groups of bits associated with subcarriers. In some implementations, TX DSP 310 may not include FFT component 440 or IFFT component 470 (e.g., when pulse shaping filter 460 is implemented to receive symbols in the time domain without FFT conversion).

Figure 5:
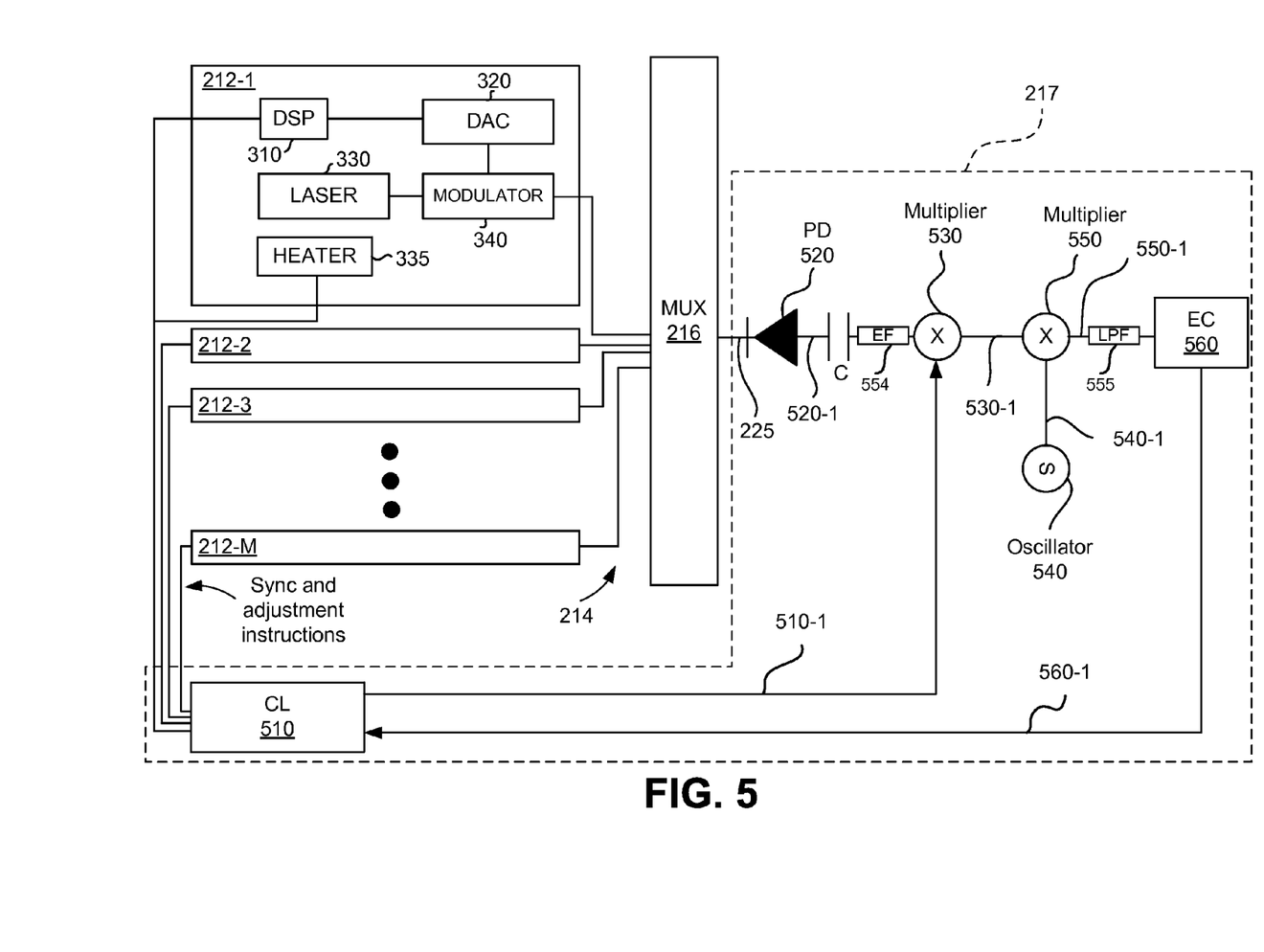
FIG. 5 is a diagram illustrating an example implementation described herein.

FIG. 5 is a diagram illustrating an example implementation described herein. As shown in FIG. 5, control system 217 may connect with transmitter module 210 to receive an optical signal (e.g., WDM signal 225). In FIG. 5, assume that WDM signal 225 includes a channel having multiple carriers (e.g., single carriers associated with multiple optical signals provided by optical transmitters 212 and/or multiple subcarriers associated with optical signals provided by optical transmitters 212). In some implementations, control system 217 may include components to determine a frequency error associated with the carriers in the channel (e.g., a difference between an actual inter-carrier gap and a target inter-carrier gap). Additionally, control system 217 may include components to adjust instantaneous frequencies of optical signals provided by optical transmitters 212 to reduce the frequency error, thereby causing the actual inter-carrier gap to adjust towards the target inter-carrier gap. For example, control system 217 may include a control logic (CL) 510, a photodetector (PD) 520, multipliers 530 and 550, oscillator 540, and error calculator (EC) 560.

CL 510 may include a processing device, such as a DSP, an ASIC, a field-programmable gate array (FPGA), or some other type of processing device. In some implementations, CL 510 may store frame pulse information that directs a DSP 310 to provide predetermined symbols to a particular carrier (or multiple subcarriers) of a corresponding optical signal provided by a laser 330 associated with the DSP 310. In some implementations, CL 510 may provide the frame pulse information to symbol selector 435. As described above, symbol selector 435 may receive the frame pulse information to identify when symbol selector 435 is to provide the predetermined symbols to the particular carrier(s). Alternatively, symbol selector 435 may store the frame pulse information based on a predetermined configuration of symbol selector 435. In some implementations, the frame pulse information may be based on a design choice and may correspond to a target inter-carrier gap between a pair of particular carriers or subcarriers.

In some implementations, CL 510 may provide gate information 510-1 to multiplier 530 (e.g., to allow multiplier 530 to determine actual inter-carrier gap between carriers, as described in greater detail below). In some implementations, the gate information 510-1 may identify time instances when symbol selector 435 provides the predetermined symbols. In some implementations, the gate information 510-1 may not identify the particular carriers that were provided with the predetermined symbols (e.g., to simplify calculations performed by multiplier 530). In some implementations, the gate information 510-1 may be provided to CL 510 (e.g., by TX DSP 310) when symbol selector 435 provides the predetermined symbols.

In some implementations, CL 510 may synchronize multiple DSPs 310, implemented within respective optical transmitters 212, such that the multiple DSPs 310 provide the predetermined symbols to respective carriers (e.g., carriers associated with WDM signal 225) of optical signals output by lasers 330 at the same time. As described above, the predetermined symbols may include a toggle pattern and a load pattern. The toggle pattern may be provided to a targeted pair of adjacent carriers (e.g., the carriers whose spacing is to be determined) and the load pattern may be provided to remaining carriers on the channel. In some implementations, the toggle pattern and load pattern may be provided to different pairs of carriers over different periods of time (e.g., to determine spacing between different pairs of carriers).

As described in greater detail below, CL 510 may receive a frequency error estimate signal from EC 560 and may adjust a temperature of heat provided by heater 335 to adjust an instantaneous frequency of an optical signal provided by laser 330 (e.g., to reduce a frequency error in the optical signal in order to obtain a target inter-carrier gap). Additionally, or alternatively, CL 510 may provide a signal to laser control port 336 and/or frequency control port 311 to adjust the frequency error.

PD 520 may include a detection device, such as a photodiode, or multiple photodiodes. In some implementations, PD 520 may output an electrical signal (e.g., electrical signal 520-1) corresponding to a received optical signal (e.g., WDM signal 225). In some implementations electrical signal 520-1 may include a current or voltage corresponding to an optical electric field of WDM signal 225. As described above, DSPs 310 may provide predetermined symbols to carriers of WDM signal 225. Thus, electrical signal 520-1 may include the predetermined symbols (e.g., as represented by a particular voltage or current of the electrical signal). In some implementations, electrical signal 520-1 may correspond to the sum of x-pol and y-pol components of WDM signal 225. In some implementations, PD 520 may provide electrical signal 520-1 to multiplier 530 (e.g., via an alternating current (AC)-couple connection that may include a capacitor (C)). In some implementations, PD 520 may include an amplifier to provide electrical signal 520-1.

In some implementations, electrical filter (EF) 554 may be included in a signal path between PD 520 and multiplier 530 to simplify calculations performed by multiplier 530 and to remove the portions of electrical signal 520-1 (e.g., particular frequencies) that may not include frequency error related information.

Multiplier 530 may include a processing circuit, such as a customer-off-the-shelf (COTS) integrated circuit, an ASIC, and/or some other type of processing circuit. As described above, multiplier 530 may receive gate information signal 510-1 from CL 510 and may receive electrical signal 520-1 from PD 520. In some implementations, multiplier 530 may multiply gate information signal 510-1 with electrical signal 520-1 to provide gated output signal 530-1. Additionally or alternatively, multiplier 530 may perform some other calculation to provide gated output signal 530-1. In some implementations, gated output signal 530-1 may indicate an actual inter-carrier gap between a pair of targeted carriers. For example, electrical signal 520-1 may identify the predetermined symbols in WDM signal 225 which may correspond to a spike in amplitude at a particular frequency at the end of a spectrum of the first targeted carrier of the pair of targeted carriers and a spike in amplitude at the beginning of the second targeted carrier (e.g., as shown in FIG. 1A, (B)).

Further, gate information 510-1 may identify when the predetermined symbols are provided to the target pair of carriers. Multiplier 530 may use gate information 510-1 to select a center portion of electrical signal 520-1 while rejecting beginning and end portions of electrical signal 520-1 (e.g., to avoid corruption of the frequency measurement related to input data). Based on electrical signal 520-1 and gate information 510-1, multiplier 530 may determine the actual spacing between the target carriers based on a difference between the spikes in frequencies associated with electrical signal 520-1. In some implementations, multiplier 530 may provide gated output signal 530-1 to multiplier 550. Multiplier 550 may also receive a target spacing signal 540-1 from oscillator 540.

Oscillator 540 may include a processing circuit, such as a COTS integrated circuit, an ASIC, and/or some other type of processing circuit. In some implementations, oscillator 540 may store information that identifies a target inter-carrier gap for a particular pair of carriers (e.g., based on a design decision that specifies the target inter-carrier gap based on a desired spacing for frequency variation, signal processing, etc.). In some implementations, oscillator 540 may provide target spacing signal 540-1 to multiplier 550.

Multiplier 550 may include a processing circuit, such as a COTS integrated circuit, an ASIC, and/or some other type of processing circuit. In some implementations, multiplier 550 may receive gated output signal 530-1 and may receive target spacing signal 540-1. Multiplier 550 may provide error signal 550-1 to EC 560 (e.g., via LPF 555). In some implementations, error signal 550-1 may identify a difference between the actual inter-carrier gap (e.g., as identified by gated output signal 530-1) and the target inter-carrier gap (e.g., as identified by target spacing 540-1). In some implementations, error signal 550-1 may include in-phase (I) and quadrature (Q) components of frequency error data corresponding to the difference between the actual inter-carrier gap and the target inter-carrier gap.

LPF 555 may include a filtering device or a collection of filtering devices. In some implementations, LPF 555 may filter portions of error signal 550-1 having frequencies above a particular threshold (e.g., to simplify calculations performed by EC 560 and to remove the portions of error signal 550-1 that may not include frequency error related information).

EC 560 may include a processing circuit, such as a COTS integrated circuit, an ASIC, and/or some other type of processing circuit. In some implementations, EC 560 may receive error signal 550-1 and may process error signal 550-1 to output frequency error estimate signal 560-1. For example, EC 560 may receive I and Q components of error signal 550-1 and may identify a difference between a rate of change in the I component and a rate of change in the Q component. That is, EC 560 may process error signal 550-1 based on a formula, such as $(I*dQ/dT)-(Q*dI/dT)$.

As above, CL 510 may receive frequency error estimate signal 560-1 from EC 560 and may adjust a temperature of heat provided by heater 335 to adjust an instantaneous frequency of an optical beam provided by laser 330 (e.g., to reduce a frequency error in an optical signal, provided by modulator 340, in order to obtain a target inter-carrier gap). As shown in FIG. 5, CL 510 may connect with one or more of optical transmitters 212-1 through 212-M to adjust respective heaters 335 based on frequency error estimate signal 560-1. As a result, frequency errors may be reduced for optical signals provided by respective modulators 340 of optical transmitters 212-1 through 212-M. As a further result of reduced frequency errors, inter-carrier gap for carriers of WDM signal 225 may be reduced towards respective target spacings.

While FIG. 5 shows a particular quantity and arrangement of components, in some implementations, additional components, fewer components, different components, or differently arranged components may be provided. Also, in some instances, one of the devices illustrated in FIG. 5 may perform a function described herein as being performed by another one of the devices illustrated in FIG. 5.

While an example implementation for determining a frequency error is described in FIG. 5, in practice, some other technique or variation of what is described in FIG. 5 may be used to determine the frequency error. For example, a combination of analog and digital components may be used in the example implementation of FIG. 5 (e.g., an analog-to-digital (ADC) to convert an analog signal to a digital signal, followed by digital processing of the digital signal to determine the frequency error). Additionally, or alternatively, direct sampling of WDM signal 225, followed by digital processing, may be performed to determine the frequency error. Additionally, or alternatively, electrical signal 520-1 may be digitized and applied with an FFT to determine the largest frequency bin relative to the target bin. In some implementations, y-polarized I components and y-polarized Q components may be inverted at different time instances to avoid interference.

Figure 6:
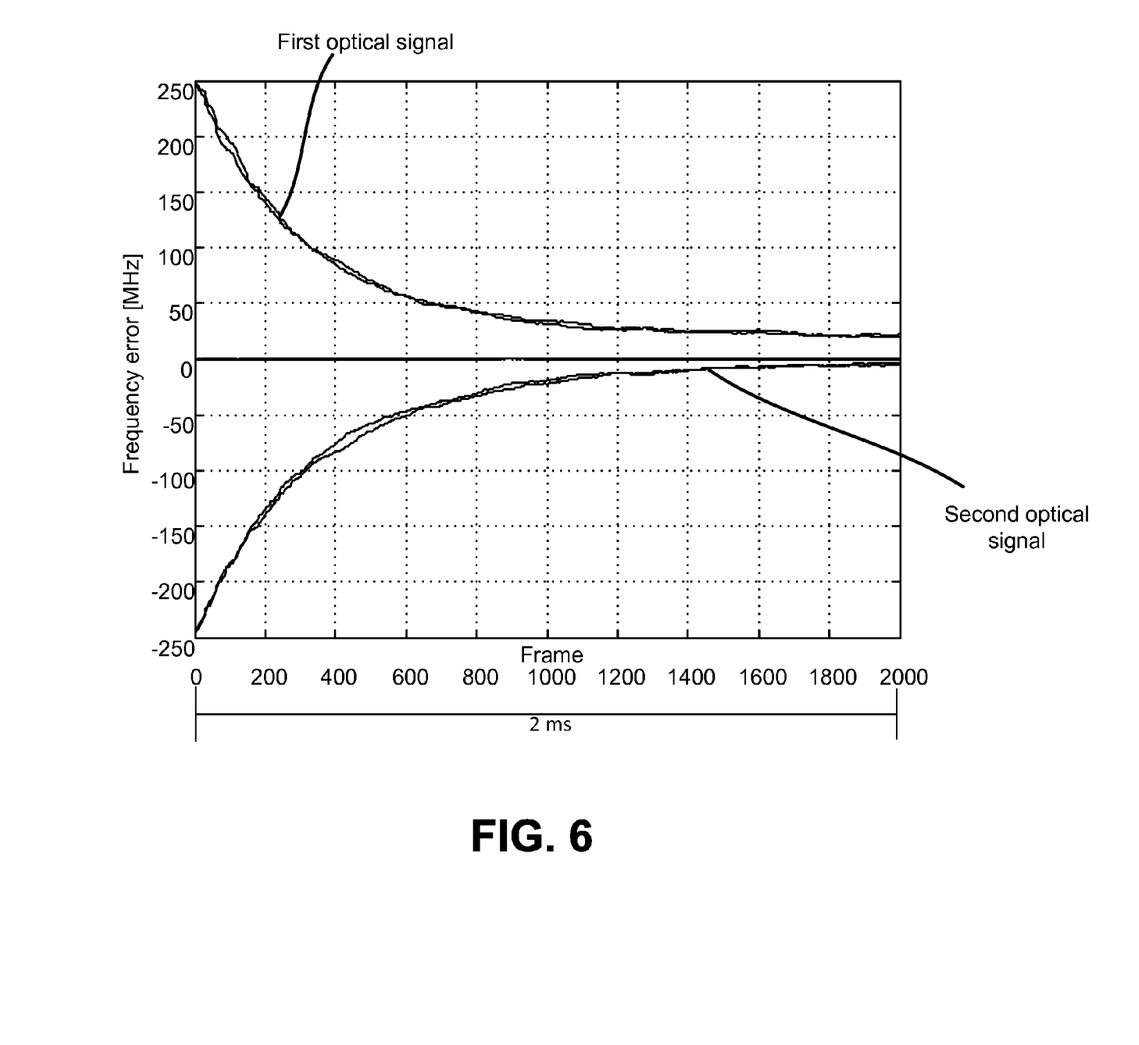
FIG. 6 is a graph illustrating example reductions in frequency errors for optical signals processed by a control system.

FIG. 6 is a graph illustrating example reductions in frequency errors for optical signals processed by control system 217. In FIG. 6, frequency errors (in megahertz (MHz)) for first and second optical signals are shown over a two millisecond (ms) time period divided into 2000 frames. FIG. 6 illustrates control system 217 removing a 500 MHz frequency error between two optical signals.

As shown in FIG. 6, at frame zero (0), the first optical signal may include a frequency error of approximately 250 MHz. As shown in FIG. 6, the frequency error approaches zero as time passes (e.g., as a result of adjustments made to heater 335, as described above). As further shown in FIG. 6, the second optical signal may include a frequency error of approximately −250 MHz at frame zero. As shown in FIG. 6, the frequency error of the second optical signal approaches zero as time passes. As a result, control system 217 may cause a frequency error to adjust towards zero whether the frequency error is negative or positive (e.g., as a result of determining the frequency error using I and Q components of the error signal, as described above).

While a particular example of a reduction in frequency errors is shown in FIG. 6 in practice the reduction in frequency errors may vary from what is shown in FIG. 6. For example, in practice, control system 217 may provide a greater frequency error than what is shown in FIG. 6 based on the performance of heater 330 and/or based on some other factor.

As described above, test pattern symbols in carriers of an optical channel may be provided to measure a frequency error and to adjust frequencies of optical signals, providing the carriers, based on the frequency error. In some implementations, optical sources that provide the optical signals may be modulated based on the frequency error to reduce the frequency error in the optical signals, thereby reducing the inter-carrier gap between the carriers. In some implementations, the inter-carrier gap may be reduced for channels having multiple carriers of varying width (e.g., as shown in FIG. 1B). In some implementations, a reduction in inter-carrier gap may allow additional bandwidth to be allocated for a channel having a particular width. Further, the additional bandwidth may be allocated while still providing for a sufficient carrier spacing to accommodate for processing and frequency variations. Additionally, or alternatively, additional subcarriers may be added to an allocated spectrum to reduce a performance penalty due to the combination of a receiver laser linewidth and electronic dispersion compensation. Additional subcarriers may also permit BER averaging over the subcarriers, which can lead to performance benefits. Additional subcarriers may also reduce power consumption.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical system comprising:
a plurality of optical transmitters configured to provide a respective plurality of optical signals,
each of the respective plurality of optical signals providing one or more carriers in an optical channel,
first and second carriers, of the plurality of carriers, having a particular carrier space width,
the particular carrier space width including a frequency error associated with one or more optical signals of the respective plurality of optical signals; and
a control system configured to:
determine the frequency error, and
cause one or more of the plurality of optical transmitters to adjust the particular carrier space width based on the frequency error,
where each of the plurality of optical transmitters includes a digital signal processor (DSP) configured to provide a plurality of predetermined symbols to the first and second carriers,
the control system being further configured to:
detect the plurality of predetermined symbols,
where when determining the frequency error, the control system is further to determine the frequency error based on detecting the plurality of predetermined symbols.

2. The optical system in accordance with claim 1, where the control system is further configured to synchronize respective DSPs, associated with the plurality of optical transmitters, to cause the each of the respective DSPs to provide the plurality of predetermined symbols at a same time.

3. An optical system comprising:
a plurality of optical transmitters configured to provide a respective plurality of optical signals,
each of the respective plurality of optical signals providing one or more carriers in an optical channel,
first and second carriers, of the plurality of carriers, having a particular carrier space width,
the particular carrier space width including a frequency error associated with one or more optical signals of the respective plurality of optical signals; and a control system configured to:
  determine the frequency error, and
  cause one or more of the plurality of optical transmitters to adjust the particular carrier space width based on the frequency error,
where one of the plurality of optical transmitters comprises:
a digital signal processor (DSP) to provide a digital signal having a plurality of predetermined symbols;
a digital-to-analog converter (DAC) to convert the digital signal, provided by the DSP, to an analog signal;
a laser to provide an optical beam;
a modulator configured to receive the optical beam and the analog signal and to provide a particular optical signal, of the respective plurality of optical signals, based on the optical beam and the analog signal,
  the first and second carriers including the plurality of predetermined symbols,
the control system being further configured to:
  detect the plurality of predetermined symbols,
  where when determining the frequency error, the control system is further to determine the frequency error based on detecting the plurality of predetermined symbols.

4. An optical system comprising:
a plurality of optical transmitters configured to provide a respective plurality of optical signals,
  each of the respective plurality of optical signals providing one or more carriers in an optical channel,
  first and second carriers, of the plurality of carriers, having a particular carrier space width,
  the particular carrier space width including a frequency error associated with one or more optical signals of the respective plurality of optical signals; and
a control system configured to:
  determine the frequency error, and
  cause one or more of the plurality of optical transmitters to adjust the particular carrier space width based on the frequency error,
where the control system comprises:
a photodetector configured to receive a combined optical signal, associated with the respective plurality of optical signals, and output a corresponding electrical signal;
a circuit configured to:
  receive the corresponding electrical signal and gate information that identifies instances when predetermined symbols are provided to the first and second carriers,
  determine the particular carrier space width based on the electrical signal and based on the gate information, and
  provide an error signal that identifies a difference between the particular carrier space width and a target carrier space width; and
a control logic configured to:
  receive the error signal,
  determine the frequency error, and
  adjust the particular carrier space width based on determining the frequency error.

5. An optical system comprising:
a plurality of optical transmitters configured to provide a respective plurality of optical signals,
  each of the respective plurality of optical signals providing a single carrier in an optical channel,
  first and second carriers, of the plurality of carriers, having a particular carrier space width between the first and second carriers,
  the particular carrier space width including a frequency error associated with one or more optical signals of the respective plurality of optical signals; and
a control system configured to:
  determine the frequency error, and
  cause one or more of the plurality of optical transmitters to adjust the particular carrier space width based on the frequency error,
where each of the plurality of optical transmitters includes a digital signal processor (DSP) configured to provide a plurality of predetermined symbols to the first and second carriers,
the control system being further configured to:
  detect the plurality of predetermined symbols,
  where when determining the frequency error, the control system is further to determine the frequency error based on detecting the plurality of predetermined symbols.

6. The optical system in accordance with claim 5, where the control system is further configured to synchronize respective DSPs, associated with the plurality of optical transmitters, to cause the each of the respective DSPs to provide the digital signal having the plurality of predetermined symbols at the same time.

7. An optical system comprising:
a plurality of optical transmitters configured to provide a respective plurality of optical signals,
  each of the respective plurality of optical signals providing a single carrier in an optical channel,
  first and second carriers, of the plurality of carriers, having a particular carrier space width between the first and second carriers,
  the particular carrier space width including a frequency error associated with one or more optical signals of the respective plurality of optical signals; and
a control system configured to:
  determine the frequency error, and
  cause one or more of the plurality of optical transmitters to adjust the particular carrier space width based on the frequency error,
where one of the plurality of optical transmitters comprises:
a digital signal processor (DSP) to provide a digital signal having a plurality of predetermined symbols;
a digital-to-analog converter (DAC) to convert the digital signal, provided by the DSP, to an analog signal;
a laser to provide an optical beam;
a modulator configured to receive the optical beam and the analog signal and to provide a particular optical signal, of the respective plurality of optical signals, based on the optical beam and the analog signal,
  the first and second carriers including the plurality of predetermined symbols,
the control system being further configured to:
  detect the plurality of predetermined symbols,
  where when determining the frequency error, the control system is further to determine the frequency error based on detecting the plurality of predetermined symbols.

8. An optical system comprising:
a plurality of optical transmitters configured to provide a respective plurality of optical signals,
  each of the respective plurality of optical signals providing a single carrier in an optical channel,
  first and second carriers, of the plurality of carriers, having a particular carrier space width between the first and second carriers,
    the particular carrier space width including a frequency error associated with one or more optical signals of the respective plurality of optical signals; and
a control system configured to:
  determine the frequency error, and
  cause one or more of the plurality of optical transmitters to adjust the particular carrier space width based on the frequency error,
where the control system comprises:
a photodetector configured to receive a combined optical signal, associated with the respective plurality of optical signals, and output a corresponding electrical signal;
a circuit configured to:
  receive the corresponding electrical signal and gate information that identifies instances when predetermined symbols are provided to the first and second carriers,
  determine the particular carrier space width based on the electrical signal and based on the gate information, and
  provide an error signal that identifies a difference between the particular carrier space width and a target carrier space width; and
a control logic configured to:
  receive the error signal,
  determine the frequency error, and
  adjust the particular carrier space width based on determining the frequency error.

9. An optical system comprising:
an optical transmitter configured to provide an optical signal on an optical channel,
  the optical signal including a plurality of carriers,
  first and second carriers, of the plurality of carriers, having a particular carrier space width between the first and second carriers,
    the particular carrier space width including a frequency error associated with the optical signal; and
a control system configured to:
  determine the frequency error, and
cause the optical transmitter to adjust the particular carrier space width based on the frequency error,
where the optical transmitter includes a digital signal processor (DSP) configured to provide a plurality of predetermined symbols to the first and second carriers,
  the control system being further configured to:
    detect the plurality of predetermined symbols,
  where when determining the frequency error, the control system is further to determine the frequency error based on detecting the plurality of predetermined symbols.

10. An optical system comprising:
an optical transmitter configured to provide an optical signal on an optical channel,
  the optical signal including a plurality of carriers,
  first and second carriers, of the plurality of carriers, having a particular carrier space width between the first and second carriers,
    the particular carrier space width including a frequency error associated with the optical signal; and
a control system configured to:
  determine the frequency error, and
cause the optical transmitter to adjust the particular carrier space width based on the frequency error,
where the optical transmitter comprises:
a digital signal processor (DSP) to provide a digital signal having a plurality of predetermined symbols;
a digital-to-analog converter (DAC) to convert the digital signal, provided by the DSP, to an analog signal;
a laser to provide an optical beam;
a modulator configured to receive the optical beam and the analog signal and to provide the optical signal based on the optical beam and the analog signal,
  the first and second carriers including the plurality of predetermined symbols,
the control system being further configured to:
  detect the plurality of predetermined symbols,
  where when determining the frequency error, the control system is further to determine the frequency error based on detecting the plurality of predetermined symbols.

11. An optical system comprising:
an optical transmitter configured to provide an optical signal on an optical channel,
  the optical signal including a plurality of carriers,
  first and second carriers, of the plurality of carriers, having a particular carrier space width between the first and second carriers,
    the particular carrier space width including a frequency error associated with the optical signal; and
a control system configured to:
  determine the frequency error, and
cause the optical transmitter to adjust the particular carrier space width based on the frequency error,
where the control system comprises:
a photodetector configured to receive the optical signal and output a corresponding electrical signal;
a circuit configured to:
  receive the corresponding electrical signal and gate information that identifies instances when predetermined symbols are provided to the first and second carriers,
  determine the particular carrier space width based on the electrical signal and based on the gate information, and
  provide an error signal that identifies a difference between the particular carrier space width and a target carrier space width; and
a control logic configured to:
  receive the error signal,
  determine the frequency error, and
  adjust the particular carrier space width based on determining the frequency error.

* * * * *